(12) United States Patent
Bejerano et al.

(10) Patent No.: US 7,409,459 B2
(45) Date of Patent: Aug. 5, 2008

(54) SYSTEM AND METHOD FOR PROVISIONING QOS PATHS WITH RESTORATION IN A NETWORK

(75) Inventors: Yigal Bejerano, Springfield, NJ (US); Yuri J. Breitbart, Silver Lake, OH (US); Ariel Orda, Haifa (IL); Rajeev Rastogi, New Providence, NJ (US); Alexander Sprintson, Haifa (IL)

(73) Assignee: Lucent Technologies Inc., Murray Hill, NJ (US)

( * ) Notice: Subject to any disclaimer, the term of this patent is extended or adjusted under 35 U.S.C. 154(b) by 985 days.

(21) Appl. No.: 10/672,535

(22) Filed: Sep. 26, 2003

(65) Prior Publication Data

US 2005/0091350 A1    Apr. 28, 2005

(51) Int. Cl.
   *G06F 15/173*    (2006.01)
(52) U.S. Cl. ...................................... 709/239; 709/241
(58) Field of Classification Search ................. 709/241, 709/239
   See application file for complete search history.

(56) References Cited

U.S. PATENT DOCUMENTS 6,377,543 B1 * 4/2002 Grover et al. ............... 709/239
2004/0205236 A1 * 10/2004 Atkinson et al. ............ 709/238
2004/0205239 A1 * 10/2004 Doshi et al. ................. 709/241

OTHER PUBLICATIONS

Iraschko, et al., "A Highly Efficient Path-Restoration Protocol for Management of Optical Network Transport Integrity;" IEEE Journal on Selected Areas in Communications, 18(5):779-793; May 2000.
Orda, "Routing With End to End QoS Guarantees in Broadband Networks;" IEEE/ACM Transactions on Networking; 7(3):365-374; Jun. 1999.
Kodialam, et al. "Restorable Dynamic QoS Routing;" IEEE Communications Magazine, 40(6):72-81; Jun. 2002.
Ergun, et al., "An Improved FPTAS for Restricted Shortest Path;" Information Processing Letters; 83(5):237-293; Sep. 2002.
Hassin, "Approximation Schemes for the Restricted Shortest Path Problem;" Mathematics of Operations Research; 17(1):36-42; Feb. 1992.
Lorenz, et al., "A Simple Efficient Approximation Scheme for the Restricted Shortest Path Problem;" Operations Research Letters; 28(5):213-219; Jun. 2001.
Suurballe, "Disjoint Path in Networks;" Networks, 4:125-145; 1974.

* cited by examiner

*Primary Examiner*—Jeffrey Pwu
*Assistant Examiner*—Benjamin R Bruckart

(57) ABSTRACT

Systems and methods for provisioning QoS paths with restoration in a network. In one embodiment, one system includes: (1) a primary path generator configured to identify a suitable primary path between source and destination nodes in a network, (2) an auxiliary graph generator, associated with the primary path generator, configured to construct a directed auxiliary graph from an undirected graph representing the network by reversing each link in a primary QoS path of the undirected graph and replacing each other link in the undirected graph by two directed links, (3) a walk identifier, associated with the auxiliary graph generator, configured to identify a walk in the auxiliary directed graph corresponding to a set of bridges in the network and (4) a bridge identifier, associated with the walk identifier, configured to identify a set of bridges in the network such that at least one link of the primary path is protected by a bridge.

21 Claims, 8 Drawing Sheets

Algorithm PP ( $G(V,E), \hat{\mathcal{P}}, \hat{d}, U$)
parameters:
$G(V,E)$ - network,
$\{d_l, c_l\}_{l \in E}$ - delays and costs of the network links,
$\hat{\mathcal{P}} = \{s = v_0, v_1, ..., t = v_n\}$ - QoS path,
$\hat{d}$- delay constraint,
$U$- the upper bound on the cost of $\mathcal{R}$.

1    $\Delta \leftarrow \hat{d} - D(\hat{\mathcal{P}})$
2    $E' \leftarrow E$
3    for each link $l = (v_i, v_{i+1}) \in \hat{\mathcal{P}}$ do
4      $E' \leftarrow E' \setminus \{(v_i, v_{i+1}) \in \hat{\mathcal{P}}\}$
5      $E' \leftarrow E' \cup \{(v_{i+1}, v_i) \in \hat{\mathcal{P}}\}, c_{(v_{i+1},v_i)} \leftarrow 0$
6    for all $v_i \in V$ do
7      $D_{v_i}[0] \leftarrow \infty$
8    $D_s[0] \leftarrow 0$
9    for $c = 1, 2, ..., U$ do
10     for each $v_j \in V$ in order such that $v_j$ is before $v_{j'}$ if $v_j$ is a successor of $v_{j'}$ in $\hat{\mathcal{P}}$ do
11      $D_{v_j}[c] \leftarrow D_{v_j}[c-1]$
12      for each link $l = (v_i, v_j) \in E'$ do
13       RELAX($l(v_i, v_j), c, \Delta$)
14    if $D_t[c] \leq D(\hat{\mathcal{P}})$ then
15     determine walk $\mathcal{W}$ by backtracking
16     return $\mathcal{W}$.
17    return FAIL

Procedure RELAX ($l = (v_i, v_j), c, \Delta$)
1   if $v_j \in \hat{\mathcal{P}}$ and $v_i \in \hat{\mathcal{P}}$ then
2       if $D_{v_i}[c] \leq D(\hat{\mathcal{P}}_{(s,v_i)})$ then
3           $D_{v_j}[c] \leftarrow \min\{D_{v_j}[c], D(\hat{\mathcal{P}}_{(s,v_j)})\}$
4   else
5       if $c_l \leq c$ then
6           $D_{v_j}[c] \leftarrow \min\{D_{v_j}[c], D_{v_i}[c - c_l] + d_l\}$
7       if $v_j \in \hat{\mathcal{P}}$ and $D_{v_j}[c] \leq D(\hat{\mathcal{P}}_{(s,v_j)}) + \Delta$ then
8           $D_{v_j}[c] \leftarrow \min\{D_{v_j}[c], D(\hat{\mathcal{P}}_{(s,v_j)})\}$

Algorithm RT ( $G(V,E), \hat{\mathcal{P}}, \hat{d}, \varepsilon$ )

parameters:
    $G(V,E)$ - network
    $\hat{\mathcal{P}} = \{s = v_1, v_2, ..., t = v_n\}$ - QoS path,
    $\hat{d}$- delay constraint
    $\varepsilon$- approximation ratio 1  $L, U \leftarrow$ BOUND($G(V,E), \hat{\mathcal{P}}, \hat{d}$)
2  do
3    $B \leftarrow \sqrt{L \cdot U}$
4    if TEST($G(V,E), \hat{\mathcal{P}}, \hat{d}, B, \varepsilon$) returns YES then
5      $L \leftarrow B$
6    else
7      $U \leftarrow 2 \cdot B$
8  until $U/L \leq 8$.
9  $\mathcal{W} \leftarrow$ SCALE($G(V,E), \hat{\mathcal{P}}, \hat{d}, L, U, \varepsilon$)
10 return the restoration topology that corresponds to $\mathcal{W}$.

Procedure SCALE($G(V,E), \hat{\mathcal{P}}, \hat{d}, L, U, \varepsilon$)
1  $S \leftarrow \frac{L\varepsilon}{2N}$
2  for each link $l \in E$ do
3    $c'_l \leftarrow \lfloor \frac{c_l}{S} \rfloor + 1$
4    $\tilde{U} \leftarrow \lfloor \frac{U}{S} \rfloor + 2N$
5  return PP($G(V,E), \{d_l, c'_l\}_{l \in E}, \hat{\mathcal{P}}, \hat{d}, \tilde{U}$)

Procedure TEST($G(V,E), \hat{\mathcal{P}}, \hat{d}, B$)
1  Apply Procedure SCALE for ($G(V,E), \hat{\mathcal{P}}, \hat{d}, B, B, 2$)
2  if Algorithm SCALE returned FAIL then
3    return NO
4  else
5    return YES

Procedure BOUND($G(V,E), \hat{\mathcal{P}}, \hat{d}$)
1  let $c^1 < c^2 < \cdots < c^r$ the distinct costs values of the links.
2  $low \leftarrow 1;\ high \leftarrow r$
3  while $low < high - 1$
4    $j \leftarrow \lfloor (high + low)/2 \rfloor$
5    $E' \leftarrow \{l \mid c_l \leq c^j\}$
6    set $c_l \leftarrow 1$ for each $l \in E'$
7    apply Algorithm PP on ($G'(V,E'), \hat{\mathcal{P}}, \hat{d}, 2N$)
8    if Algorithm PP returned FAIL then
9      $high \leftarrow j$
10   else
11     $low \leftarrow j$
12 $U \leftarrow 2N \cdot c^{high};\ L \leftarrow c^{high};$
13 return $L, U$;

*Algorithm* DRT ( $G(V,E), \hat{\mathcal{P}}, \hat{d}, \varepsilon$ )

parameters:
 $G(V,E)$ - network
 $\hat{\mathcal{P}} = \{s = v_1, v_2, \ldots, t = v_n\}$ - QoS path,
 $\hat{d}$ - delay constraint
 $\varepsilon$ - approximation ratio 1  $\hat{d}' \leftarrow 2\hat{d} - D(\hat{\mathcal{P}})$
2  $L, U \leftarrow$ BOUND$(G(V,E), \hat{\mathcal{P}}, \hat{d}')$
3  do
4   $B \leftarrow \sqrt{L \cdot U}$
5   Apply Procedure SCALE for $(G(V,E), \hat{\mathcal{P}}, \hat{d}', B, B, \varepsilon)$
6   if Procedure SCALE return FAIL then
7    $L \leftarrow B$
8   else
9    Set $\mathcal{W}$ be the walk returned by Procedure SCALE
10   if $C(\mathcal{W}) \leq L$ then
11    return the restoration topology $\mathcal{R}$ that corresponds to $\mathcal{W}$.
12   else
13    $U \leftarrow 2 \cdot B$,
14  until $U/L \leq 8$.
15  Apply Procedure SCALE for $(G(V,E), \hat{\mathcal{P}}, \hat{d}', L, U, \varepsilon)$
16  if Procedure SCALE does not fail then
17   Set $\mathcal{W}$ be the walk returned by Procedure SCALE
18   return the restoration topology $\mathcal{R}$ that corresponds to $\mathcal{W}$.

*FIG. 8*

SYSTEM AND METHOD FOR PROVISIONING QOS PATHS WITH RESTORATION IN A NETWORK

TECHNICAL FIELD OF THE INVENTION

The present invention is directed, in general, to computer network management and, more specifically, to a system and method for provisioning Quality of Service (QoS) paths with restoration in a network.

BACKGROUND OF THE INVENTION

A growing interest exists among service providers to offer their customers new revenue-generating services with Quality of Service (QoS) guarantees. This is facilitated by current efforts to provide resource reservations and explicit path routing, e.g., MultiProtocol Label Switching (MPLS).

On the other hand, physical network infrastructures may be prone to failures. For example, in optical networks, a single link failure is frequent enough in order to warrant consideration (see, e.g., Iraschko, et al., "A Highly Efficient Path-Restoration Protocol for Management of Optical Network Transport Integrity," IEEE Journal on Selected Areas in Communications, 18(5):779-793, May 2000).

Therefore, a key requirement for such services is that they also be resilient to failures. This goal, namely, providing QoS paths with failure resilience, can be achieved by provisioning primary and restoration paths that satisfy the QoS constraints. The primary QoS path is used during normal network operation; upon failure of a network element (node or link) in the primary path, the traffic is immediately switched to a restoration path. To facilitate this seamless recovery to a restoration path in the event of a failure, it is necessary to reserve network resources (e.g., bandwidth) on both the primary and restoration QoS paths. Such resources should be consumed in a network-wide efficient manner.

A common way for modeling the impact of such resource consumption on each link is by associating "costs" with the links. Accordingly, a major problem is to find primary and restoration paths that satisfy end-to-end QoS constraints at minimum cost. This problem is the subject of this study.

QoS constraints occur naturally in a number of practical settings involving bandwidth and delay sensitive applications such as voice over IP, audio and video conferencing, multimedia streaming etc. QoS constraints can be divided into bottleneck constraints, such as bandwidth and additive constraints, such as delay or jitter.

QoS routing has been the subject of several recent studies and proposals (see, e.g., Crawley, et al., "A Framework for QoS-based Routing in the Internet—RFC No. 2386," Internet RFC, August 1998; Ma, et al., "Quality of Service Routing for Traffic with Performance Guarantees," in Proceedings of International Workshop on Quality of Service (IWQoS '97), Columbia University, New York, N.Y., May 1997; Orda, "Routing With End to End QoS Guarantees in Broadband Networks," IEEE/ACM Transactions on Networking, 7(3): 365-374, June 1999; Sobrinho, "Algebra and Algorithms for QoS Path Computation and Hop-by-Hop Routing in the Internet," in Proceedings of IEEE INFOCOM 2001, Anchorage, AK, April 2001; and references therein). However, none of the prior studies on QoS routing consider the problem of provisioning QoS paths with restoration.

Similarly, path restoration and routing over alternate paths has also attracted a large body of research (see, e.g., Italiano, et al., "Restoration Algorithms for Virtual Private Networks in the Hose Model," in Proceedings of IEEE INFOCOM 2002, New York, N.Y., June 2002; Kar, et al., "Routing Restorable Bandwidth Guaranteed Connections using Maximum 2-Route Flows," in Proceedings of IEEE INFOCOM 2002, New York, N.Y., June 2002; Kodialam, et al., "Dynamic Routing of Bandwidth Guaranteed Tunnels with Restoration," in Proceedings of IEEE INFOCOM 2000, Tel-Aviv, Israel, March 2000; Krishna, et al., "A Segmented Backup Scheme for Dependable Real Time Communication in Multihop Networks," in Proceedings of Workshop on Parallel and Distributed Real-Time Systems (WPDRTS 2000), Cancun, Mexico, May 2000; and Li, et al., "Efficient Distributed Path Selection for Shared Restoration Connections," In Proceedings of IEEE INFOCOM 2002, New York, N.Y., June 2002, all incorporated herein by reference). Most of the proposed solutions, however, consider only bottleneck QoS constraints. The few studies that do consider additive constraints, focus on heuristic approaches and do not provide proven performance guarantees.

Bottleneck QoS constraints can be efficiently handled by pruning infeasible links. However, additive QoS constraints are more difficult to handle. Indeed, the basic problem of finding an optimal path that satisfies an additive QoS constraint is NP-hard (see, e.g., Garey, et al., Computers and Intractability, Freeman, San Francisco, Calif. 1979). Moreover, it turns out that, in the presence of additive QoS constraints, the widely used approach of disjoint primary and restoration paths is not an optimal strategy.

Accordingly, what is needed in the art are systems and methods for provisioning Quality of Service (QoS) paths with restoration for use in networks that handle both bottleneck and additive QoS constraints and that are most preferably computationally efficient, so paths can be computed and recovered in real-time.

SUMMARY OF THE INVENTION

It has been found that providing a restoration topology, i.e., a set of bridges, with each bridge protecting a portion of the primary path is a better solution than the disjoint paths strategy described above. While a restoration topology requires more sophisticated switching with a proper signaling mechanism, it has several advantages over the disjoint paths strategy. First, it provides a cheaper solution in terms of resource consumption. Second, it may find a solution when one does not exist for the disjoint paths strategy (see, Krishna, et al., supra). Third, a restoration topology strategy uses fewer backup links upon a failure, which facilitates more efficient sharing of backup bandwidth (see, Kodialam, et al., supra). Finally, the restoration topology strategy enables the network to recover from a failure by simply activating a local bridge, rather than switching to a completely new path.

Accordingly, the problem of provisioning primary and restoration paths that satisfy QoS constraints will be defined and described herein. Since this problem is NP-hard, solutions that are guaranteed to be within a certain factor of the optimum will be presented. Focusing on the fundamental problem of resilience to a single failure, two major advances in the art will be described herein.

First, the issue of link sharing by different bridges, which complicates the process of finding the set of optimal bridges, will be detailed. An optimal restoration topology in which each link is shared by at most two bridges will be disclosed. This enables restoration topologies to be identified having a cost is at most two times more than the optimum.

Second, the novel concept of "adjusted delay" will be detailed. Adjusted delay allows the set of bridges included in a restoration topology to be represented as a single "walk"

between the source and the destination nodes. (In contrast to a "path," a "walk" may include loops.) This concept makes it possible to adapt in a nonobvious way standard techniques, such as Bellman-Ford's Shortest Path algorithm (see, e.g., Cormen, et al., *Introduction to Algorithms*, MIT Press, Cambridge, Mass. 1990, incorporated herein by reference), for identification of restoration topologies.

These advances in the art may be contained in systems and methods for provisioning QoS paths with restoration in a network. In one embodiment, one system includes: (1) a primary path generator configured to identify a suitable primary path between source and destination nodes in a network, (2) an auxiliary graph generator, associated with the primary path generator, configured to construct a directed auxiliary graph from an undirected graph representing the network by reversing each link in a primary QoS path of the undirected graph and replacing each other link in the undirected graph by two directed links, (3) a walk identifier, associated with the auxiliary graph generator, configured to identify a walk in the auxiliary directed graph corresponding to a set of bridges in the network and (4) a bridge identifier, associated with the walk identifier, configured to identify a set of bridges in the network such that at least one link of the primary path is protected by a bridge.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 illustrates a pseudocode listing of an Algorithm PP including Procedure RELAX;

FIG. 5 illustrates a pseudocode listing of an Algorithm RT including Procedures SCALE, TEST and BOUND;

FIG. 8 illustrates a pseudocode listing of an Algorithm DRT;

DETAILED DESCRIPTION

A Network Model

Figure 1:
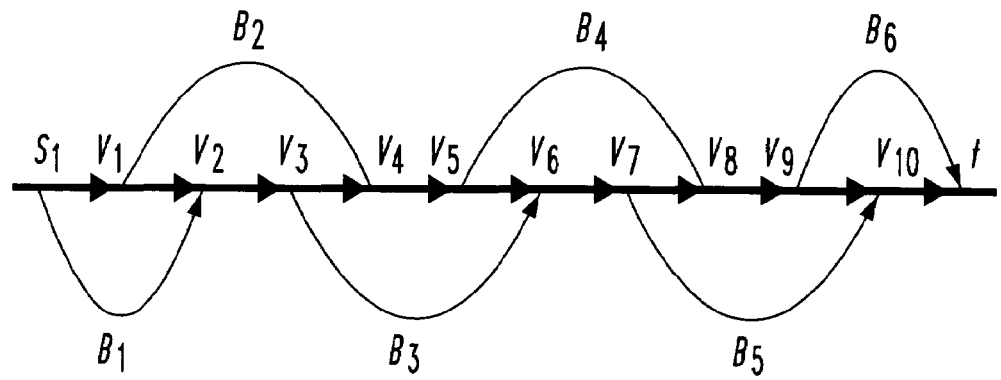
FIG. 1 illustrates a schematic diagram of a network within which the system or the method of the present invention can operate advantageously.

A network model and the two problems addressed by the present invention will now be described. For simplicity of exposition, the terms "bandwidth" and "delay" requirements will be used to refer to bottleneck and additive QoS constraints, respectively.

The network is represented by an undirected graph G(V, E), where V is the set of nodes and E is the set of links. N and M denote the number of network nodes and links, respectively, i.e., N=|V| and M=|E|.

An (s, t)-walk is a finite sequence of nodes in a walk W=(s=$v_0, v_1, \ldots, t=v_n$), such that, for $0 \leq i \leq n-1$, ($v_i, v_{i+1}$)∈E. Here, n=|W| is the hop count of W.

Note that nodes and links may appear in a walk several times. An (s, t)-path P is an (s, t)-walk having distinct nodes. $W_{(v,vj)}$ ($P_{(v, vj)}$) denotes the subwalk (subpath) of W(P) that extends from $v_i$ to $v_j$. If $W_1$ is a (v, u)-walk and $W_2$ is a (u, w)-walk, $W_1 \circ W_2$ denotes the (v, w)-walk formed by the concatenation of $W_1$ and $W_2$.

Each link l∈E offers a bandwidth guarantee $b_1$ (which is typically the available bandwidth on l), and a delay guarantee $d_1$. The bandwidth B(W) of a walk W is identical to the bandwidth of its most restrictive link, i.e., B(W)= $\min_{l \in W}\{b_1\}$. The delay D(W) of a walk W. This the sum of the delay guarantees of its links, i.e., D(W)=$\Sigma_{l \in W} d_1$.

To satisfy QoS constraints, certain resources such as bandwidth and buffer space must be reserved along QoS paths. To optimize the global resource utilization, QoS paths that consume as few network resources as possible need to be identified. Accordingly, a nonnegative cost $c_1$, which estimates the quality of the link in terms of resource utilization, is associated with each link l. The link cost may depend on various factors, e.g., its available bandwidth and location. The cost C(W) of a walk W is defined to be the sum of the costs of its links, i.e., C(W)=$\Sigma_{l \in W} c_1$.

Network links are prone to failures. As Kar, et al., supra, and Kodialam, et al., "Restorable Dynamic QoS Routing," IEEE Communications Magazine, 40(6):72-81, June 2002, it is assumed that only a single failure can occur at a time. Indeed, protection from multiple failures incurs excessively high cost in terms of network utilization, which, typically, is not justified by the rare occurrence of simultaneous failures.

To model networks with nodes connected by asymmetric or unidirectional links, directed graphs will also be considered. For instance, in such networks, for a pair of connected nodes ($v_i, v_j$), the bandwidth provisioned on the link in the direction from $v_i$ to $v_j$ may be much larger than the allocated bandwidth in the opposite direction. In addition, the delay and cost characteristics of a link ($v_i, v_j$) may be very different from those of the reverse link ($v_j, v_i$).

A fundamental problem in QoS routing is to identify a minimum cost path between a source s and a destination t that satisfies some delay and bandwidth constraints. Bandwidth requirements can be efficiently handled by simply pruning infeasible links from the graph, i.e., links l having a bandwidth $b_l$ that is lower than the constraint. Thus, only delay requirements will be considered from this point forward. Accordingly, the fundamental problem is to find a minimum cost path that satisfies a given delay constraint. This can be formulated as a "Restricted Shortest Path" (RSP) problem.

Problem RSP: Given a source node s, a destination node t and a delay constraint $\hat{d}$, find an (s, t)-path $\hat{P}$ such that (1) $D(\hat{P}) \leq \hat{d}$, and (2) $C(\hat{P}) \leq C(P)$ for every other (s, t)-path P that satisfies $D(P) \leq \hat{d}$.

In general, Problem RSP is intractable, i.e., NP-hard (see, Garey, et al., supra). However, pseudo-polynomial solutions exist that give rise to fully polynomial approximation schemes (FPAS), having a reasonable computational complexity (see, e.g., Ergun, et al., "An Improved FPTAS for Restricted Shortest Path," Information Processing Letters, 83 (5):237-293, September 2002; Hassin, "Approximation Schemes for the Restricted Shortest Path Problem," Mathematics of Operations Research, 17(1):36-42, February 1992; and Lorenz, et al., "A Simple Efficient Approximation Scheme for the Restricted Shortest Path Problem," Operations Research Letters, 28 (5):213-219, June 2001, incorporated herein by reference). An FPAS provides a solution having a cost that is at most 1+ε times more than the optimum and a time complexity that is polynomial in the size of the input and 1/ε.

The most efficient algorithm, presented in Lorenz, et al., supra, has a computational complexity of O(MH(1/ε+log log H)), and computes a path with delay at most $\hat{d}$ and cost at most 1+ε times the optimum. This algorithm will be referred to as Algorithm RSP.

As mentioned earlier, the focus herein is on provisioning QoS paths with restoration. The QoS path that is used during normal network operation is referred to as the "primary path." Upon failure of a network element (node or link) in the primary path, the traffic is immediately switched to a "restoration path." Thus, in addition to the primary path, the restoration paths are also required to satisfy the delay constraint $\hat{d}$. Although link failures will be explicitly illustrated and described, the teachings herein can be easily extended to deal with node failures by using conventional node splitting techniques (see, e.g., Suurballe, "Disjoint Path in Networks," Networks, 4:125-145, 1974, incorporated herein by reference).

A common approach for path restoration is to provision two disjoint paths that satisfy the delay constraint. However, as illustrated below (see also, Krishna, et al., supra), in some cases, such disjoint paths do not exist, although it is possible to provision a primary path with a set of restoration paths. Consider the network depicted in FIG. 1. Here, the delay of all links is 10, except for the links marked by bold lines, which have a delay of one. The only two disjoint paths between the source node s and the destination node t are $P_1=\{s, v_1, v_4, v_5, v_8, v_9, t\}$ and $P_2=\{s, v_2, v_3, v_6, v_7, v_{10}, t\}$. For a delay constraint $\hat{d}=20$, $P_1$ and $P_2$ cannot be used as primary and restoration paths, because $D(P_1)=D(P_2)=33>20$. However, it is possible to provision a primary path $\hat{P}$ and a set of restoration paths that satisfy the delay constraint d=20. Specifically, the primary path $\hat{P}=\{s, v_1, v_2, \ldots, v_{10}, t\}$ and restoration paths $\{\hat{P}_1, \ldots, \hat{P}_6\}$ are defined as follows. Upon failure of links (s, $v_1$) or ($v_1$, $v_2$), restoration path $\hat{P}_1=B_1 \circ \hat{P}_{(v_2, t)}$ with $D(\hat{P}_1)=19$ is used, while upon failure of link ($v_2$, $v_3$) path $\hat{P}_2=\hat{P}_{(s_j, v_1)} \circ B_2 \circ \hat{P}_{(v_4, t)}$ with $D(\hat{P}_2)=18$ is used. Similarly, restoration paths $\hat{P}_3, \ldots, \hat{P}_6$ are constructed.

As demonstrated in the example above, a restoration path comprises portions of the primary path and a bridge B, which serves as a backup for the failed segment of the primary path. For example, in FIG. 1, the restoration paths $\hat{P}_1$ and $\hat{P}_2$ include the bridges $B_1=\{s, v_2\}$ and $B_2=\{v_1, v_4\}$, respectively.

Definition 1 (Bridge for a link failure): Let $\hat{P}=\{s=v_0, \ldots, t=v_n\}$ be a QoS path and $\hat{P}(v_i, v_j)$ be a subpath of $\hat{P}$. A path B between $v_i \in \hat{P}$ and $v_j \in \hat{P}$ that has no common links with $\hat{P}$ is referred to as a "bridge." Bridge $B=\{v_i, \ldots, v_j\}$ is said to "protect" the subpath $\hat{P}_{(v_i, v_j)}$ of $\hat{P}$.

Recall that each restoration path must satisfy the delay constraint $\hat{d}$. This implies that the delay D(B) of a bridge B must also be constrained. Specifically, the delay of a bridge $B_i=\{s_i, \ldots, t_i\}$ must be at most $D(\hat{P}_{(s_i, t_i)})+\hat{d}-D(\hat{P})$, where $\hat{P}_{(s_i, t_i)}$ is the subpath of $\hat{P}$ protected by $B_i$. The quantity $\hat{d}-D(\hat{P})$ is denoted by Δ. Clearly, for larger values of Δ, it is possible to find cheaper bridges $B_i=\{s_i, \ldots, t_i\}$ that satisfy $D(B_i) \leq D(\hat{P}_{(s_i, t_i)})+\Delta$ A set of bridges that provides a restoration path for the failure of any link $l \in \hat{P}$ is referred to as a "restoration topology."

Definition 2 (Restoration topology for link failures):
If $\hat{d}$ is a QoS constraint and $\hat{P}=\{s=v_0, \ldots, v_n=t\}$ is a QoS path that satisfies $\hat{d}$ (i.e., $D(\hat{P}) \leq \hat{d}$), a "restoration topology" R for ($\hat{P}$, $\hat{d}$) is a set of bridges $\{B_1, B_2, \ldots, B_h\}$ such that:

(1) for each bridge $B_i=\{s_i, \ldots, t_i\}$, $D(B_i) \leq D(\hat{P}_{(s_i, t_i)})+\hat{d}-D(\hat{P})$, and (2) for each link $l \in \hat{P}$, a bridge $B_i=\{s_i, \ldots, t_i\}$ exists that "protects" l, i.e., l is included in the subpath $\hat{P}_{(s_i, t_i)}$ of $\hat{P}$ protected by $B_i$.

R is referred to as a "feasible restoration topology," to emphasize that each restoration path satisfies the delay constraint $\hat{d}$. Let E(R) be the set of links that belong to bridges of R, i.e., $E(R)=\{l | l \in B_i, B_i \in R\}$. The cost of a restoration topology is defined as the total cost of links in E(R), i.e., $C(R)=\Sigma_{l \in E(R)} c_l$. The cost of each link is counted only once, even if it belongs to several bridges. |E(R)| denotes the number of links in the restoration topology.

Restoration topologies that minimize the usage of network resources are most advantageous. Since the cost of a link is a measure of its desirability for routing (with lower cost links being more desirable), the goal is to find a (feasible) restoration topology R with minimum cost C(R). OPT denotes the minimum cost of a restoration topology for ($\hat{P}$, $\hat{d}$).

Depending on how costs are assigned to links, the methodologies described herein enable a wide range of restoration topologies to be selected. For example, associating unit costs with all links would translate into computing restoration topologies with a minimum number of links. In an optimal restoration topology, the subpaths of $\hat{P}$ protected by two bridges $B_i$ and $B_j$ are not nested, one within the other. Thus, for any two bridges $B_i=\{s_i, \ldots t_i\}$ and $B_j=\{s_j, \ldots, t_j\}$ in R, if $s_i$ precedes $s_j$ in $\hat{P}$, $t_i$ also precedes $t_j$ in $\hat{P}$, and vice versa. For clarity of presentation, the bridges in R are assumed to be enumerated such that the source $s_i$ of bridge $B_i$ is either identical to or a predecessor of the destination $t_{i-1}$ of bridge $B_{i-1}$ in $\hat{P}$.

The two problems that are considered herein can now be defined. The first problem seeks to compute a suitable restoration topology for a given QoS path.

Problem RT (Restoration topology for a QoS Path): Given an (s, t)-path $\hat{P}$ and a QoS constraint $\hat{d}$, such that $D(\hat{P}) \leq \hat{d}$, find a minimum cost restoration topology R for ($\hat{P}$, $\hat{d}$).

Next, the problem of provisioning a QoS path with a restoration topology is considered.

Problem P+RT (QoS Path and Restoration topology): Given a source s, a destination t and a QoS constraint $\hat{d}$, find an (s, t)-path $\hat{P}$ that satisfies $D(\hat{P}) \leq \hat{d}$ and a restoration topology R for $(P^\wedge, d^\wedge)$ such that their total cost $C(P^\wedge)+C(R)$ is minimum.

Each of the above problems, namely Problems RT and P+RT, includes Problem RSP as a special case; hence, they are both NP-hard. Furthermore, as discussed below, in most cases an efficient solution cannot be provided without violating the delay constraint in the restoration paths. Accordingly, the following definition of $(\alpha, \beta)$-approximations is introduced.

Definition 3 (($\alpha, \beta$)-approximation): For constants $\alpha$ and $\beta$, an ($\alpha, \beta$)-approximate solution to either Problem RT or Problem P+RT is a solution, for which:
(1) the cost is at most $\alpha$ times more than the optimum;
(2) the primary path satisfies the delay constraint; and
(3) each restoration path violates the delay constraint by a factor of at most $\beta$.

The following table summarizes the approximation ratios obtained for the above two problems. Below, $\epsilon$ is a constant that captures the trade-off between the quality of the approximations and the running time of the algorithms. Specifically, the time complexity of the algorithms is proportional to $1/\epsilon$; thus smaller values of $\epsilon$ yield better approximate solutions at the expense of higher running times.

TABLE 1

Approximation Ratios for Problems RT and P + RT

| Problem | Undirected | Directed |
|---|---|---|
| RT | $(2 \cdot (1 + \epsilon), 1)$ | $(2 \cdot (1 + \epsilon), 2)$ |
| P + RT | $(3 \cdot (1 + \epsilon), 2)$ | $(3 \cdot (1 + \epsilon), 3)$ |

The solutions of Problem P+RT violate delay constraints only for restoration paths. Furthermore, such violations are limited by a constant factor. The primary paths always satisfy the QoS constraints. Therefore, such delay violations have no effect during normal network operation. Moreover, many time-sensitive applications can tolerate short-term delay violations (until the failed link is repaired), e.g., by way of buffering.

Properties of Restoration Topologies

Finding an optimal restoration topology is a complicated problem due to the fact that bridges may share links. However, an optimal restoration topology in which the number of appearances of a node or a link is bounded by two will now be shown to exist. This bound is then used to obtain an approximate scheme within a factor of $2 \cdot (1+\epsilon)$ of the optimal solution.

The following Lemma 1 is set forth without proof.

Lemma 1: Given an undirected graph G, a delay constraint $d^\wedge$, an (s, t)-path $P^\wedge$, $D(P^\wedge) \leq d^\wedge$ and a restoration topology R for $(P^\wedge, d^\wedge)$, a restoration topology $R^\wedge$ exists for $(P^\wedge, d^\wedge)$, such that $C(R^\wedge) \leq C(R)$ and each node $v \in R^\wedge$ or link $l \in R^\wedge$ is included in, at most, two bridges.

A similar bound of two on the degree of sharing for each link in a directed network graph will be derived below. But first, approximation algorithms will be developed for Problems RT and P+RT for the undirected graph scenario.

Adjusted Delay and Feasible Walk Concepts

Now, the basic concepts of adjusted delay and feasible walk, which lay the foundations for the efficient approximation algorithms for Problems RT and P+RT, will be introduced.

To set the stage for the concept of adjusted delay, a simple algorithm for Problem RT will first be presented. The simple algorithm, at a high level, includes the following steps. First, for each node pair $(v_i, v_j)$ in $P^\wedge$, the cheapest bridge $B_{(i,j)} = \{v_i, \ldots, v_j\}$ having a delay that is at most $D(P^\wedge_{(v_i, v_j)}) + \Delta$ is computed. For this, all the links of the path $P^\wedge$ are deleted from G, and Algorithm RSP (see, Lorenz, et al., supra) is applied to the resulting graph. Next, a restoration topology is constructed by selecting a subset of bridges $\{B_{(i,j)}\}$ such that each link of $P^\wedge$ is protected and the total cost is minimum. To achieve this, an auxiliary directed graph G is constructed having nodes that are essentially the nodes of P. Further, for each link $(v_i, v_{i+1}) \in P^\wedge$, a link $l = (v_{i+1}, v_i)$ is added to G and assigned a zero cost. Also, for each pair $(v_i, v_j)$ of nodes of $P^\wedge$, such that $j > i$, a link $l = (v_i, v_j)$ is added to G and assigned a cost that identical to the cost of the bridge $B_{(i,j)}$.

It will now be shown that each (s, t)-path in G corresponds to a feasible restoration topology. Consider an (s, t)-path P in G, and let S be the set of bridges that corresponds to links in P. Consider two successive bridges $B_i = \{s_i, t_i\}$ and $B_{i+1} = \{s_{i+1}, t_{i+1}\}$ in S. Note that $s_{i+1}$ either precedes $t_i$ or coincides with $t_i$, while $t_{i+1}$ succeeds $t_i$ in the path $P^\wedge$. This ensures that every link in $P^\wedge$ is protected by a bridge, and thus S corresponds to a feasible restoration topology. Hence, a near-optimal restoration topology can be determined by finding the shortest (s, t)-path in G. Specifically, Lemma 1 and the fact that Algorithm RSP returns a $(1+\epsilon)$-approximation for each $B_{(i,j)}$ jointly imply that a shortest path algorithm (run on G) provides a $(2 \cdot (1+\epsilon), 1)$-approximate solution.

The simple algorithm, while conceptually straightforward, is computationally expensive, because calls for Algorithm RSP (see, Lorenz, et al., supra) to be applied to each pair of nodes in $P^\wedge$. Since the time complexity of the RSP algorithm is $O(MN(1/\epsilon + \log \log N))$, the simple algorithm requires a total of $O(MN^3(1/\epsilon + \log \log N))$ time. Now a more advantageous algorithm, Algorithm RT, will be described.

The simple algorithm exploited the relationship between the shortest path in an auxiliary graph and the restoration topology. Algorithm RT will use this relationship again, but more efficiently. According to Algorithm RT, a directed auxiliary graph G' is constructed from G by reversing each link $l \in P^\wedge$ and assigning it a zero cost. In addition, each link $l = (u, v) \in G$, $l \notin P^\wedge$ is replaced by two directed links $l_1 = (u, v)$ and $l_2 = (v, u)$ such that $c_{l_1} = c_{l_2} = c_l$ and $d_{l_1} = d_{l_2} = d_l$. Each (s, t)-walk in the auxiliary graph G' corresponds to a set of bridges that protects each link $l \in P^\wedge$.

Figure 2:
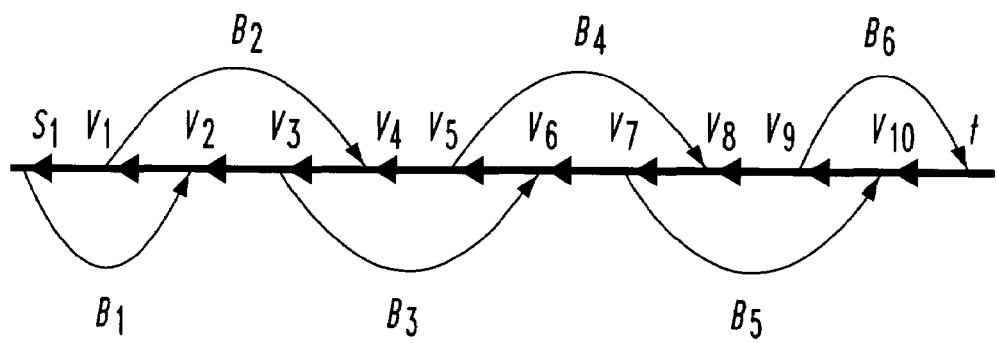
FIG. 2 illustrates an auxiliary graph G' of the network of FIG. 1.

For example, FIG. 2 depicts the auxiliary graph for the network depicted in FIG. 1 and the primary path $P^\wedge = \{s, v_1, v_2, \ldots, t\}$. The walk $W = \{s, v_2, v_1, v_4, v_3, \ldots, t\}$ in auxiliary graph G' corresponds to a set of bridges $\{B_1, \ldots, B_6\}$. In general, however, as explained below, not every (s, t)-walk in the auxiliary graph corresponds to a "feasible" restoration topology, i.e., one that satisfies the delay constraint.

One important disclosure herein is an efficient method for verifying, during its construction, whether a given walk represents a feasible restoration topology. This method is used as a basic building block in the preferred embodiment of the disclosed algorithm, and enables a low-cost feasible restoration topology to be found. To identify a walk in G' that corresponds to a feasible restoration topology, the notion of "adjusted delay" for a walk W in G' is introduced.

Consider a walk $W = \{s = u_0, \ldots, u_{k-1}, u_k, \ldots, t\}$ in G' that defines a set $S = \{B_i = \{s_i, \ldots, t_i\}\}$ of bridges, and let $P_i$ be the restoration path obtained by activating the bridge $B_i$; thus, $P_i = P^\wedge_{(s, s_i)} \circ B_i \circ P^\wedge_{(t_i, t)}$. Nodes $s_i$ and $t_i$ are referred to as the "start-point" and "termination-point" of bridge $B_i$, respectively. Recall that a bridge $B_i$ satisfies the delay constraint only if $D(B_i) \leq D(P^\wedge_{(s_i, t_i)}) + \Delta$, or, equivalently, $$D(P_{i(s, t_i)}) \leq D(P^\wedge_{(s, t_i)}) + \Delta. \quad (1)$$

Furthermore, every subwalk $W_{(s, u)}$ of W corresponds to a subset S' of complete bridges in S and, possibly, a subpath of an additional bridge $B_j \in S$. The adjusted delay $D(W_{(s, u)})$ of the walk $W_{(s, u)}$ maintains the following invariant: if all the bridges in S' satisfy the delay constraint, $D(W_{(s, u)})$ represents the delay between the source node s and the node $u \in B_j$ along $P_j$, i.e., $D(W_{(s, u)}) = D(P_{j(s, u)})$. Otherwise, if S' contains a bridge that does not satisfy the delay constraint, $D(W_{(s, u)})$ is set to infinity, thus indicating that the restoration topology formed by the walk $W_{(s, u)}$ is infeasible. Thus, by applying Condition (1), the adjusted delay enables one to check easily whether bridge $B_j$ satisfies the delay constraint, when its termination-point $t_j$ is reached.

The adjusted delay D(W) of a walk $W = \{s = u_0, \ldots, u_{k-1}, u_k, \ldots, t\}$ is calculated in a recursive manner. The adjusted delay of an empty walk is zero; that is $D(\{s\}) = 0$. Now, the adjusted delay of $W_{(s, u_k)}$ is computed. Suppose that the adjusted delay of the sub-walk $W_{(s, u_{k-1})}$ has already been calculated.

Figure 3:
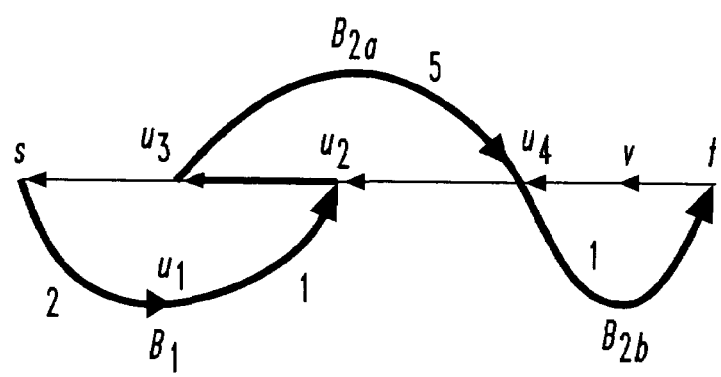
FIG. 3 illustrates an example of a walk W in the auxiliary graph G' of FIG. 3.

Let $D = D(W_{(s, u_{k-1})})$ where $d_{(u_{k-1}, u_k)}$ is the delay of the link $(u_{k-1}, u_k)$. Generally speaking, the adjusted delay $D(W_{(s, u^k)}) = D$, except for the case when $u_k \in \hat{P}$. In this case, a special procedure is required for verifying if node $u_k$ is the termination-point of a bridge and whether the newly formed bridge satisfies the delay constraint. Again, $u_k \in \hat{P}$ is not necessarily a termination-point of a bridge, since a bridge may have several common nodes with the primary path. For instance, in FIG. 3, bridge $B_2$ comprises of the two segments $B_{2a}$ and $B_{2b}$, and node $u_4 \in \hat{P}$ is not a termination-point of a bridge. However, if $u_k \in \hat{P}$ and $u_{k+1} \in \hat{P}$ for link $(u_k, u_{k+1})$ of W, $u_k$ must be the termination-point of a bridge, since a bridge cannot share links with the primary path. As illustrated in FIG. 3, node $u_2$ must be the termination-point of the bridge $B_1$, since its successor node in the walk, node $u_3$, is also included in $\hat{P}$.

Based on the above observations, the adjusted delay of a walk ending at node $u_k \in \hat{P}$ is defined as follows. (Below, $D = D(W_{(s, u_{k-1})}) + d_{(u_{k-1}, u_k)}$).

Case 1: If $u_{k-1} \notin \hat{P}$, $u_k \in \hat{P}$ and $D > D(\hat{P}_{(s, u_k)}) + \Delta$ cannot be the termination-point of a valid bridge and it may only be an internal node of a bridge. Thus, $D(W_{(s, u_k)}) = D$.

Case 2: If $u_{k-1} \notin \hat{P}$, $u_k \in \hat{P}$ and $D \leq D(\hat{P}_{(s, u_k)}) + \Delta$, node $U_k$ may be either the termination-point or an internal node of a bridge. As a result, since $u_k$ may be the starting-point of a new bridge, $D(W_{(s, u_k)}) = \min\{D(\hat{P}_{(s, u_k)}), D\}$.

Case 3: If $u_{k-1} \in \hat{P}$, $u_k \in \hat{P}$ and $D(W_{(s, u_{k-1})}) \leq D(\hat{P}_{(su_{k-1})})$, node $u_k$ is not a termination-point of a bridge, and all the bridges included by the walk satisfy the delay constraint. Since $u_k$ may be the starting-point of a new bridge, $D(W_{(s, u_k)}) = D(\hat{P}_{(s, u_k)})$.

Case 4: If $u_{k-1} \in \hat{P}$, $u_k \in \hat{P}$ and $D(W_{(s, u_{k-1})}) > D(\hat{P}_{(s, u_{k-1})}) + \Delta$, and if node $u_{k-1}$ is the termination-point of a bridge (that is, the predecessor of $u_{k-1}$ in walk W does not belong to $\hat{P}$), the bridge ending at $u_{k-1}$ does not satisfy the delay constraint (due to Condition (1)). On the other hand, if $u_{k-1}$ is not the termination-point of a bridge, an induction argument can be used to show that some bridge preceding $u_{k-1}$ in walk W does not satisfy the delay constraint. Hence, $D(W_{(s, u_k)}) = \infty$.

Now, a formal definition of adjusted delay that considers the four cases mentioned above will be presented.

Definition 4 (Adjusted Delay): If $\hat{P}$ is a primary path and G' is the auxiliary graph formed from G by reversing each link $l \in \hat{P}$, the adjusted delay D(W of a walk $W = \{s = u_0, \ldots, u_{k-1}, u_k\}$ in G' is defined recursively as follows:

(1) the adjusted delay of an empty walk (i.e., k=0) is 0: D({S})=0; otherwise (2) the adjusted delay D(W of a walk $W = \{u_0, \ldots, u_{k-1}, u_k\}$ is $$\tilde{D}(W) = \begin{cases} \min\{D(\hat{P}_{(s,u_k)}), D\} & \text{if } u_{k-1} \notin \hat{P} \text{ and } D \leq D(\hat{P}_{(s,u_k)}) + \Delta \\ D(\hat{P}_{(s,u_k)}) & \text{if } u_{k-1} \in \hat{P} \text{ and } \tilde{D}(W_{(s,u_{k-1})}) \leq D(\hat{P}_{(s,u_k)}) + \Delta \\ \infty & \text{if } u_{k-1} \in \hat{P} \text{ and } \tilde{D}(W_{(s,u_{k-1})}) > D(\hat{P}_{(s,u_k)}) + \Delta \\ D & \text{otherwise,} \end{cases}$$

where $D = D(W_{(s, u_{k-1})}) + d_{(u_{k-1}, u_k)}$.

The calculation of the adjusted delay will now be illustrated using the walk shown in bold in FIG. 3. Here, the primary path $\hat{P} = \{s, u_3, u_2, u_4, v, t\}$. The delay of every link $l \in \hat{P}$ is $d_1 = 1$ and the delay constraint $\hat{d} = 7$. Thus, $D(\hat{P}) = 5$ and $\Delta = 2$. The delay of every other link $l \notin \hat{P}$ is depicted in FIG. 3. The adjusted delay of the walk $W_{(s, t)}$ and its various prefixes are calculated. At the base of the recursion, $D(\{s\}) = 0$. Since node $u_1 \notin \hat{P}$, $D(W_{(s, u_1)}) = 2$. For computing the adjusted delay of node $u_2$, the value $D = D(W_{(s, u_1)}) + d_{(u_1, u_2)} = 3$. Since $D \leq D(\hat{P}_{(s, u_2)}) + \Delta = 4$, node $u_2$ may be either the termination-point of a bridge that satisfies the delay constraint or an internal node of a bridge. To allow these two possibilities, $D(W_{(s, u_2)}) = \min\{D(\hat{P}_{(s, u_2)}), D\} = \min\{2, 3\} = 2$. Since $u_3 \in \hat{P}$, node $u_2$ must be the termination-point of the bridge $B_1$. Since the bridge $B_1$ satisfies the delay constraint, $D(W_{(s, u_2)}) = D(\hat{P}_{(s, u_3)}) = 1$. Now, to compute $D(W_{(s, u_4)})$, the corresponding value $D = D(W_{(s, u_3)}) + d_{(u_3, u_4)} = 6$ is calculated. Because $D > D(\hat{P}_{(s, u_4)}) + \Delta = 3 + 2 = 5$, node $u_4$ can only be an internal node inside a bridge and its adjusted delay is $D(W_{(s, u_4)}) = 6$. Finally, when computing the adjusted delay of $W_{(s, t)}$, $D = D(W_{(s, u_4)}) + d_{(u_4, t)} = 7$ Node t is the termination-point of a valid bridge $B_2$ and $D(W_{(s, t)}) = \min\{D(\hat{P}), D\} = 5$. It is therefore concluded that the given walk represents a feasible restoration topology.

An (s, t)-walk having an adjusted delay that does not exceed the delay $D(\hat{P})$ of the primary path $\hat{P}$ is referred to as a "feasible (s, t)-walk." From Lemma 2 below, it follows that a one-to-one correspondence exists between feasible walks and feasible restoration topologies. Lemma 2 is set forth without proof.

Lemma 2:
(1) If $R = \{B_1, B_2, \ldots, B_h\}$ is a feasible restoration topology and W is the corresponding (s, t)-walk in G', $D(W) \leq D(\hat{P})$.
(2) If $\hat{P}$ is a primary path and W is an (s, t)-walk in the auxiliary graph G' such that $D(W) \leq D(\hat{P})$, a feasible restoration topology R corresponding to W exists.

In general, more than one way may exist to decompose a walk into a set of bridges, i.e., several sets of bridges can be constructed out of a single walk. For example, FIG. 3 illustrates two sets of bridges $S_1$ and $S_2$ that correspond to walk W: $S_1$ is formed by bridges $\{B_1, B_{2a}, B_{2b}\}$, while in $S_2$ the bridges $B_{2a}$ and $B_{2b}$ are combined into a single bridge $B_2$. Note that only some of these sets constitute feasible restoration topologies. A feasible restoration topology can be constructed from a feasible walk by choosing the first node $u_k \in \hat{P}$ in the bridge for which $D(W_{(s, u_k)}) = D(\hat{P}_{(s, u_k)})$ as the termination-point for a bridge.

$W^{OPT}$ denotes the minimum cost feasible (s, t)-walk in the auxiliary graph G', and $c^{OPT}$ denotes the cost of $W^{OPT}$. A relationship between $W^{OPT}$ and the optimum restoration topology (having a cost denoted by OPT) will now be shown to exist.

Suppose that each link in the auxiliary graph G' that originated from a link l∈P^ is assigned a cost of zero. Clearly, due to Lemmas 1 and 2, it follows that a feasible walk W exists such that C(W)≦2·OPT. Thus, $C^{OPT}$≦2·OPT. Further, the cost of a restoration topology constructed from a walk never exceeds the cost of the walk itself. Thus, if the optimal feasible walk can be computed, a (2, 1)-approximation to the optimal restoration topology can be computed.

Approximation Schemes for Provisioning of Restoration Topologies

Now, efficient approximation schemes for Problems RT and P+RT can be presented. A pseudo-polynomial algorithm for Problem RT serves as the basic building block for the approximation scheme for Problem RT first presented below. Then, the approximation scheme for Problem P+RT is presented.

The fundamental concepts of adjusted delay and feasible (s, t)-walk give rise to a pseudo-polynomial algorithm for Problem RT, i.e., an algorithm having a running time that is proportional to the cost of the optimal solution. The algorithm, referred to as "Algorithm PP," will now be presented. Because of its simplicity, the algorithm can be easily implemented in practice. However, in the worst case, its running time can be relatively high.

Algorithm PP computes a minimum-cost feasible (s, t)-walk W Sand the corresponding restoration topology. The algorithm is an extension of the well-known Bellman-Ford algorithm and uses the dynamic-programming technique of relaxation (see, e.g., Cormen, et al., supra). The algorithm assumes that the costs of links are integer values greater than zero, and an upper bound U on the cost of the solution is given.

The relaxation technique used by Algorithm PP will now be described. For each node $v_i$∈V, an array $D_{v_i}[c]$ of minimum delay estimates is maintained. The array $D_{v_i}[c]$ stores, for each cost c, the minimum adjusted delay of an (s, $v_i$)-walk having a cost that is at most c. Initially, $D_{v_i}[c]$=∞ for every $v_i$∈S\s and c≧0. Only links having a cost that does not exceed the current budget restriction c are relaxed. The process of relaxing a link ($v_i$, $v_j$) involves testing whether the best (s, $v_j$)-walk (i.e., the walk having a minimum adjusted delay) found so far to $v_j$ by going through $v_i$ can be improved without exceeding the current budget restriction c. If so, $D_{v_j}[c]$ is updated. The relaxation technique is implemented by Procedure RELAX (see FIG. 4).

Next, Algorithm PP will be described, the pseudocode for which appears in FIG. 4. The purpose of Algorithm PP is to check, for a given value of upper bound U, whether an (s, t)-walk W exists in G', such that D(W)≦D(P^) and C(W)≦U, and if so, to find a minimum cost (s, t)-walk W such that D(W)≦D(P^). c starts with a zero budget and is incremented by one in each iteration until either $D_t[c]$≦D(P^), i.e., a walk exists between s and t having an adjusted delay that is at most D(P^), or else c=U. In each iteration, each node $v_j$∈G' is processed by relaxing all links entering $v_j$.

As discussed below, in the approximation technique described herein, Algorithm PP is applied to graphs in which $c_l$≧1 for each link l. Thus, the cost of each link l∈G' is at least one, except for links in G' that originate from the primary path P^. Note that for each link ($v_i$, $v_j$) with zero cost, node $v_i$ should be processed before $v_j$. Accordingly, the nodes $v_j$∈G' are processed in an order such that $v_j$ is before $v_j$, if $v_j$ is a successor of $v_i$ in P^.

Also, in Step 15, the algorithm identifies a walk W={s=$u_0$, . . . , $u_k$=t} having an adjusted delay that is at most D(P^) using backtracking. Suppose that c is the value at which Algorithm PP breaks out of the for-loop (in Step 16), that is, $D_t[c]$≦D(P^). Then, beginning with node t, for each node $u_i$, the backtracking procedure adds to the returned walk, the link ($u_{i-1}$, $u_i$) that resulted in the value $D_{u_i}[c_i]$ until node s is reached, where the $c_i$ values for $u_i$ are computed as follows: for the initial node $u_k$=t, $c_k$=c and for every subsequent node $u_{i-1}$, $c_{i-1}$=$c_i$−$c_{(u_{i-1}, u_i)}$. Thus, the cost of the walk W can be shown to be at most c. The computational complexity of Algorithm PP is O(M·U).

The following Theorem 1 is set forth without proof.

Theorem 1: $C^{OPT}$ denotes the minimum cost of a feasible (s, t)-walk in G'. If U≧$C^{OPT}$, Algorithm PP returns a minimum cost walk W such that D(W)≦D(P^).

Now, an FPAS for computing the minimum cost feasible (s, t)-walk will be developed and used to construct a near-optimal restoration topology.

An important building block of the scheme is Procedure SCALE (FIG. 5), which uses scaling and rounding to efficiently find an approximate solution. The efficiency of Procedure SCALE depends on the tightness of the lower and upper bounds, L, U, on the cost of the optimal solution. Thus, to compute sufficiently tight lower and upper bounds, two procedures, namely Procedure BOUND and Procedure TEST are relied upon. The former is used for obtaining initial values of L, U such that U/L<2·N, while the latter performs iterations to tighten the bounds further. Finally, all the ideas are combined in Procedure RT.

Procedure SCALE is described with reference to FIG. 5. The main idea is to scale and round the cost $c_l$ of each link l∈E, replacing it by $c'_l$, as follows.

$$c'_l = \left\lfloor \frac{c_l}{S} \right\rfloor + 1,$$

where $$S = \frac{L\varepsilon}{2N}.$$

Clearly, with the new costs $c'_l$, a feasible walk must exist with cost at most $$\left\lfloor \frac{c^{OPT}}{S} \right\rfloor + 2N$$

and no more than 2N links (due to Lemma 1). Thus, the actual cost of the path returned by Algorithm PP (in the final step) is no more than $c^{OPT}$+2NS≦(1+ε)·$c^{OPT}$. It follows that, if Procedure SCALE is invoked with valid lower and upper bounds, i.e., L≦$c^{OPT}$≦U, Procedure SCALE returns a walk having a cost that is at most (1+ε) times more than the optimum. This discussion is summarized in the following Lemma 3, which is set forth without proof.

Lemma 3: If Procedure SCALE is invoked with valid upper bound, i.e., $c^{OPT}$≦U, Procedure SCALE returns a walk having a cost that is at most (1+ε) times more than the optimum.

Procedure SCALE might return a feasible walk even if it is invoked with an invalid upper bound, i.e., $C^{OPT}$>U. However, the cost of a walk W returned by the algorithm always satisfies C(W)≦Lε+U. This property will be used below to compute tight lower and upper bounds on $c^{OPT}$. Lemma 4 is now set forth without proof.

Lemma 4: Any walk W returned by Procedure SCALE is feasible and satisfies $C(W) \leq L\epsilon + U$.

The running time of Procedure SCALE is $O(MNU/\epsilon L)$. Thus, if tight lower and upper bounds can be computed on $C^{OPT}$ such that the ratio $U/L$ is a constant, the computation time of Procedure SCALE can be reduced to $O(MN/\epsilon)$. It will now be shown how to compute these tight bounds.

Procedure BOUND (see FIG. 5) identifies lower and upper bounds $L, U$ on the minimum cost $C^{OPT}$ of a feasible walk W such that $U/L \leq 2N$.

$c^1 < c^2 < \ldots < c^r$ denotes the distinct costs values of the links. The goal is to find the maximum cost value $c^* \in \{c^i\}$ such that the graph $G''$ derived from $G'$ by omitting all links having a cost greater than $c^*$, does not contain a feasible (s, t)-walk. Clearly, a feasible (s, t)-walk contains at least one link having a cost that is $c^*$ or more, hence $c^*$ is a lower bound on $C^{OPT}$. In addition, a feasible (s, t)-walk exists that comprises links having a cost that is $c^*$ or less, and a hop count that is, by Lemma 1, at most $2N$. $2N \cdot c^*$ is an upper bound on $c^{OPT}$.

Procedure BOUND performs a binary search on the values $c^1, c^2, \ldots, c^r$. At each iteration, $c \leq c^*$ needs to be checked, where $c$ is the current estimate of $c^*$. For this purpose, all links having a cost that is more than $c$ are removed from $G$. A unit cost is assigned to the remaining links. Then, Algorithm PP is applied on the resulting graph, with the parameter $U=2N$. If Algorithm PP returns a feasible walk, $c \geq c^*$; otherwise, $c < c^*$. The computational complexity of Procedure BOUND is $O(MN \log N)$.

To tighten the bounds further, Procedure TEST (shown in FIG. 5) is used. Procedure TEST performs the following 2-approximation test: if Procedure TEST returns a positive answer, $C^{OPT} < 2B$; otherwise, $C^{OPT} \geq B$.

Procedure TEST is implemented by invoking Procedure SCALE with $U=L=B$ and $\epsilon=1$. Lemma 5 is now set forth without proof.

Lemma 5: If Procedure TEST returns a positive answer, $C^{OPT} \leq B(1+\epsilon)$. Otherwise, $C^{OPT} > B$.

The results of the above exercises can be integrated to yield a final approximation algorithm, referred to herein as "Algorithm RT" (see FIG. 5).

The algorithm begins by applying Procedure BOUND, which provides the lower and upper bounds $L$ and $U$ on $C^{OPT}$ such that $U/L \leq 2N$. Then, Procedure TEST is iteratively applied to improve these bounds until the ratio $U/L$ falls below 8. In each iteration, Procedure TEST is invoked with $B=\sqrt{L \cdot U}$. If Procedure TEST returns a positive answer, $C^{OPT} < 2B$, and $U$ is set to $2B$. Otherwise, $C^{OPT} > B$, and $L$ is set to $B$. Note that, if the ratio $U/L$ is equal to $x$ at the beginning of an iteration, $(U/L) \leq 2\sqrt{x}$ at the end of the iteration. Since the above process terminates once $U/L \leq 8$, the number of iterations performed can be shown to be $O(\log \log N)$.

Having obtained lower and upper bounds $L, U$ such that $U/L \leq 8$, Procedure SCALE is employed to find a feasible walk W having a cost that is at most $(1+\epsilon) \cdot c^{OPT}$. Finally, the restoration topology corresponding to W is returned. Lemma 6 is now set forth without proof.

Lemma 6: The computational complexity of Algorithm RT is $O(MN(1/\epsilon+\log N))$.

The following Theorem 2 summarizes these results and is set forth without proof.

Theorem 2: Given an undirected graph G, a primary QoS path $P\hat{} \in G$, a delay constraint $d\hat{}$ and an approximation ratio $\epsilon$, Algorithm RT identifies, in $O(MN(1/\epsilon+\log N))$ time, a feasible restoration topology R for $(P\hat{}, d\hat{})$, having a cost that is at most $2 \cdot (1+\epsilon)$ times more than the optimum.

Approximation Scheme for Problem P+RT

The approximation scheme for simultaneous provisioning of a primary QoS path and the restoration topology is implemented as follows. First, using Algorithm RSP, a d-delay constrained (s, t)-path $P\hat{}$ having a cost that is at most $(1+\epsilon)$ times the optimum is identified in G. Then, Algorithm RT is applied with parameters $G, P\hat{}, (d\hat{}+D(P\hat{}))$ and $\epsilon$. The resulting algorithm is referred to as "Algorithm P+RT." The following Theorem 3 is set forth without proof.

Theorem 3: Algorithm P+RT identifies, in $O(MN(1/\epsilon+\log N))$ time, a $(3 \cdot (1+\epsilon), 2)$-approximate solution for Problem P+RT.

Directed Networks

Now, the previous results will be extended to apply for directed networks, modeled as directed graphs. In such networks, for a pair of connected nodes $(v_i, v_j)$, the bandwidth provisioned on the link in the direction from $v_i$ to $v_j$ may be much larger than the allocated bandwidth in the opposite direction. In addition, the delay and cost characteristics of a link $(v_i, v_j)$ may be quite different from those of the reverse link $(v_j, v_i)$. With such asymmetric links, it is possible that a node or a link is shared by several bridges. This constitutes a significant obstacle for identifying efficient solutions.

Figure 6:
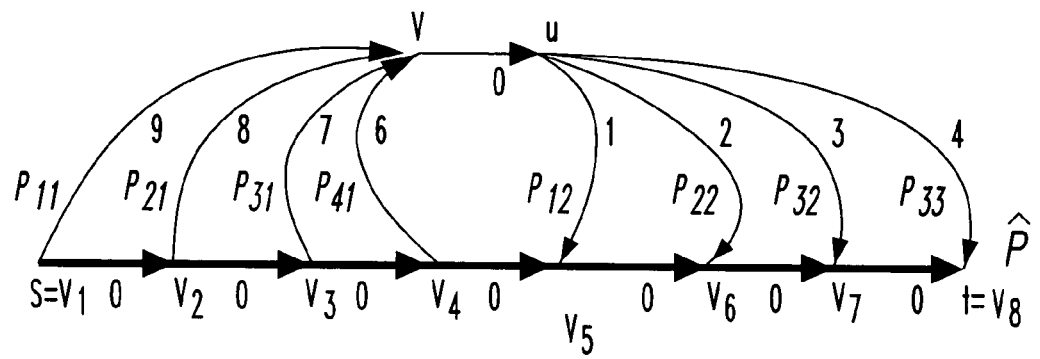
FIG. 6 illustrates a schematic diagram of a network containing an example of a restoration topology R={$B_1, B_2, B_3, B_4$}, wherein, $B_1$={$v_0, v, u, v_4$}), $B_2$={$v_1, v, u, v_5$}, $B_3$={$v_2, v, u, v_6$} and $B_4$={$v_3, v, u, v_7$}.

For example, consider the network depicted in FIG. 6. The numbers show the link delays. For a delay constraint $d\hat{}=10$, only one feasible restoration topology $R=\{(B_1, B_2, B_3, B_4\}$, $B_1=\{v_0, v, u, v_4\}, B_2=\{v_1, v, u, v_5\}, B_3=\{v_2, v, u, v_6\}$ and $B_4=\{v_3, v, u, v_7\}$ exists. Note that the nodes v, u and the link (v, u) are shared by all the bridges of R.

Figure 7:
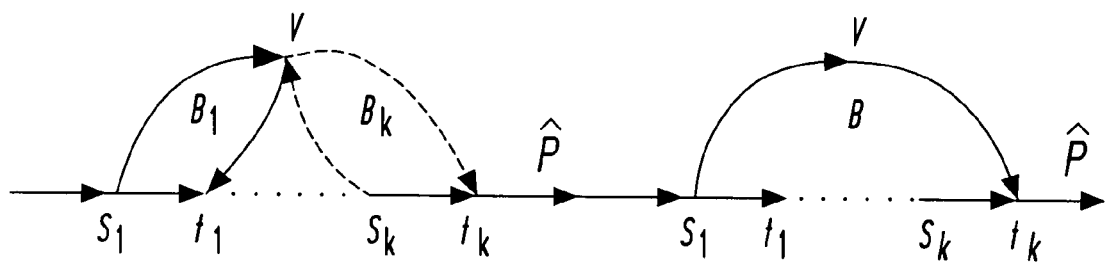
FIGS. 7A and 7B together illustrate schematic diagrams of a node v being shared by bridges $B_1$ and $B_k$ (FIG. 7A) and bridges $B_1$ and $B_k$ being combined into a single bridge B, (FIG. 7B)

This obstacle may be overcome by combining bridges. Specifically, let R be an optimal restoration topology for $(P\hat{}, d\hat{})$ and let $\{B_1, B_2, \ldots, B_k\}, k \geq 3$ be the set of R's bridges that contain the node v, sorted according to their indexes, where $B_i=\{s_i, \ldots, t_i\}$. Bridges $B_l$ and $B_k$ are combined into a single bridge B, such that $B=B_1(s_1, v) \circ B_k(v, t_k)$, as depicted in FIGS. 7A and 7B. Since the subpaths of $D\hat{}$ protected by the bridges $B_1$ and $B_k$ are disjoint, the delay of bridge B may exceed the delay of the subpath of $P\hat{}$ protected by bridge B by at most $2\Delta=2 (d\hat{}-D(P\hat{}))$. This idea supports the following Lemma 7, which is the counterpart of Lemma 1 for undirected networks and is set forth without proof.

Lemma 7: Given a directed graph G, a delay constraint $d\hat{}$ and an (s, t)-path, $D(P\hat{}) < d\hat{}$, a restoration topology $R\hat{}$ exists for $(P\hat{}, 2d\hat{}-D(P\hat{}))$ such that $C(R\hat{}) \leq OPT$, and each node $v \in R\hat{}$ or link $l \in R\hat{}$ is shared by at most two bridges.

Note that, in Lemma 7, $R\hat{}$ is a feasible restoration topology with respect to $\Delta=2d\hat{}-D(P\hat{})$. Thus, to achieve an efficient solution, the delay constraint is relaxed and $\Delta=2d\hat{}-D(P\hat{})$ is used instead of $\Delta=d\hat{}-D(P\hat{})$, as in the case of undirected networks. For example, the (simple) algorithm presented above is invoked with $\Delta=2(d\hat{}-D(P\hat{}))$. By Lemma 7, the algorithm provides a $(2 \cdot (1+\epsilon), 2)$-approximate solution for Problem RT.

$W^{OPT}$ denotes the optimal walk with respect to $\Delta=2d\hat{}-D(P\hat{})$. $c^{OPT}$ denotes the cost of $W^{OPT}$.

Generally, the approximation scheme for directed networks is similar to the undirected case, except for the following:

(1) the adjusted delay is defined with respect to $\Delta=2(d\hat{}-D(P\hat{}))$:

(2) Algorithm PP is applied with $\Delta=2(d\hat{}-D(P\hat{}))$ (instead of $\Delta=d\hat{}-D(P\hat{})$; and (3) a more elaborate procedure is required for finding the lower and upper bounds $L, U$ on $c^{OPT}$.

Recall that the approach for the undirected case was to first identify lower and upper bounds, $L$ and $U$, on the cost of an optimum walk $c^{OPT}$, such that $U/L \leq 2N$, and then iteratively improve these bounds by employing scaling on the link costs. For directed networks, however, computing a lower bound L on $c^{OPT}$ incurs high complexity. This is because any optimum walks might have a large hop count (recall that, in the undirected case, by Lemma 1, an optimum walk exists having a hop count that is at most 2N).

The approach in the directed case is to consider, for the purpose of computing the lower bound, only walks having hop counts that do not exceed 2N. More specifically, $W_{2N}^{OPT}$ denotes the feasible walk of minimum cost having a hop count that is at most 2N. $C_{2N}^{OPT}$ denotes the cost of $W_{2N}^{OPT}$. The lower bound L is then used on $C_{2N}^{OPT}$ instead of $C^{OPT}$. The bounds L and U are iteratively improved until either a suitable walk is found or $U/L \leq 8$. In the latter case, Procedure SCALE is applied with parameters L and U to find a suitable walk. Procedure SCALE is based on the following Lemmas 8 and 9, which are set forth without proof.

Lemma 8: $c_{2N}^{OPT} \leq 2OPT$.

Lemma 9: If $c_{2N}^{OPT} \leq U$, Procedure SCALE returns a feasible walk W having a cost that is at most $(1+\epsilon)$ times more than $c_{2N}^{OPT}$, i.e., $C(W) \leq (1+\epsilon) \cdot c_{2N}^{OPT}$.

Now, the FPAS will be described in more detail. First, Procedure BOUND is invoked with parameters G(V, E), P^ and d^. It is straightforward to verify that Procedure BOUND returns lower and upper bounds L and U on $c_{2N}^{OPT}$ such that $U/L \leq 2N$. Next, the following iterative process is used to improve the bounds U and L. At each iteration, $B = \sqrt{L \cdot U}$ is computed, and Procedure SCALE is applied for L=U=B. Several possible cases exist.

Case 1: Procedure SCALE returns FAIL. Therefore, due to Lemma 9, no feasible walk W exists such that $C(W) \leq B$ and $|W| \geq 2N$. Accordingly, $L \leftarrow B$.

Case 2: Procedure SCALE returns a feasible walk W such that $C(W) \leq L$. Therefore, the Procedure SCALE halts and returns the walk W. Note that $C(W) \leq c_{2N}^{OPT} \leq 2 \cdot OPT$.

Case 3: Procedure SCALE returns a feasible walk W such that $L < C(W) \leq 2B$. Since it is possible that $|W| > 2N$, $U \leftarrow B$.

Note that, by Lemma 4, if Procedure SCALE does not fail, it returns a feasible walk W, having a cost that is at most 2B. Hence, all possible cases are covered. Procedure SCALE stops when a suitable walk is found or $U/L \leq 8$.

Having obtained a lower bound L on $c_{2N}^{OPT}$ and an upper bound U on $c^{OPT}$ such that $U/L \leq 8$, Procedure SCALE is applied for L and U. If Procedure SCALE fails, L>U. Hence, the walk W due to which the upper bound U was assigned its current value is returned. Note that, due to Lemma 8, $C(W) \leq L \leq c_{2N}^{OPT} < 2 \cdot OPT$. Otherwise, due to Lemma 9, Procedure SCALE returns a walk W such $C(W) \leq (1+\epsilon)c_{2N}^{OPT}$. In both cases, a feasible restoration topology R^ that corresponds to W is identified. It follows that $C(R^) \leq 2(1+\epsilon)OPT$. The FPAS is implemented by Algorithm DRT, the formal description for which appears in FIG. 8.

The following Theorem 4 summarizes these results and is set forth without proof.

Theorem 4: Given are a directed graph G, a primary QoS path $P^ \epsilon G$, a delay constraint d^ and an approximation ratio $\epsilon$. Algorithm DRT identifies, in $O(MN(1/\epsilon + \log N))$ time, a feasible restoration topology R for (P^, 2d^−D (P^)), having a cost that is at most $2(1+\epsilon)$ times more than OPT, i.e., a $(2(1+\epsilon), 2)$-approximate solution to Problem RT.

The approximation algorithm for identifying the primary QoS path and restoration topology is similar to the undirected case. Namely, a d^-delay-constrained (s, t)-path P^ having a cost that is at most $(1+\epsilon)$ times more than the optimum is first identified in G. Then, Algorithm DRT is applied with parameters G, P^, (d^+D(P^)) and $\epsilon$. The resulting algorithm is referred to as "Algorithm DP+RT." The following Theorem 5 is set forth without proof.

Theorem 5: Algorithm DP+RT identifies, in $O(MN(1/\epsilon + \log N))$ time, a $(3(1+\epsilon), 3)$-approximate solution for Problem P+RT in directed graphs.

Figure 9:
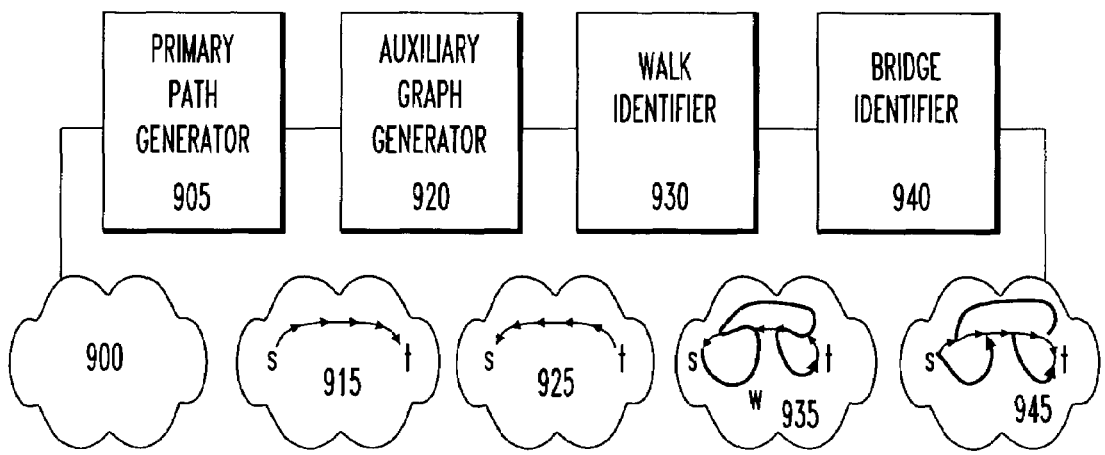
FIG. 9 illustrates a block diagram of one embodiment of a system for provisioning QoS paths with restoration in a network constructed according to the principles of the present invention.

Turning now to FIG. 9, illustrated is a block diagram of one embodiment of a system, generally designated 910, for provisioning QoS paths with restoration in a network 900 constructed according to the principles of the present invention. The system 910 includes an primary path generator 905, an auxiliary graph generator 920, a walk identifier 930 and a bridge identifier 940.

The primary path generator 905 is configured to identify a suitable primary path 915 between source and destination nodes in a network 900. The auxiliary graph generator 920 is configured to construct a directed auxiliary graph 925 from an undirected graph representing the network 900 and the primary QoS path 915. The auxiliary graph generator 920 does so by reversing each link in a primary QoS path 915 and replacing each link of the undirected graph 900 that is not included in the primary path by two directed links as described above. The walk identifier 930 is configured to identify a walk 935 in the auxiliary directed graph 925. The bridge identifier 940 is configured to identify a set of bridges 945 in the network such that at least one link of the primary path is protected by a bridge. The bridge identifier 940 does so by decomposing the walk 935 into a set of bridges 945.

Figure 10:
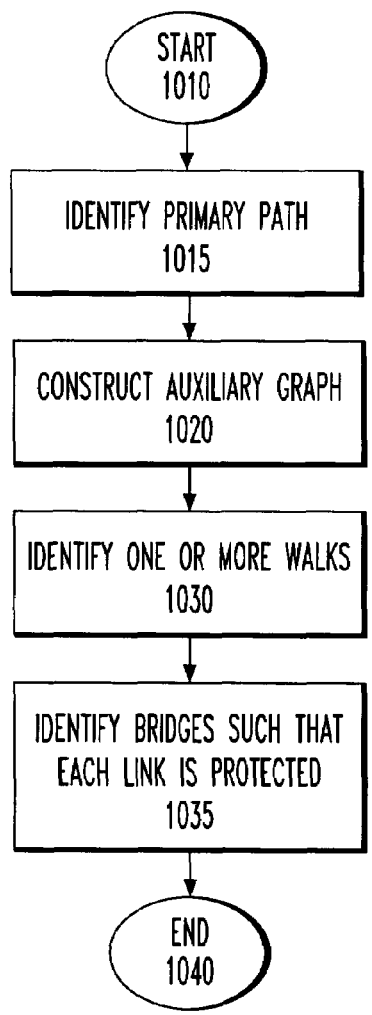
FIG. 10 illustrates a flow diagram of one embodiment of a method of provisioning QoS paths with restoration in a network carried out according to the principles of the present invention.

Turning now to FIG. 10, illustrated is a flow diagram, generally designated 1000, of one embodiment of a method of provisioning QoS paths with restoration in a network carried out according to the principles of the present invention. The method 1000 is carried out when it is desired to create either or both of primary and restoration QoS paths in a network.

The method begins in a start step 1110. In step 1015, a primary QoS path is identified. In a step 1120, a directed auxiliary graph is constructed from an undirected graph that represents the network. Each link in a primary QoS path is reversed and each link of the undirected graph is replaced by two directed links.

The method 1110 proceeds to step 1130, in which one or more walks are identified in the auxiliary directed graph. In the illustrated embodiment, the walks may constitute primary or restoration QoS paths, as needed, and are of minimum cost. The method 1110 proceeds to step 1130, in which restoration topologies are put in place by decomposing walks into sets of bridges. The method 1000 ends in an end step 1040.

From the above, it is apparent that the problem of provisioning QoS paths with restoration has been addressed. Specifically, algorithms that compute a primary QoS path and a restoration topology comprising of a set of bridges, each of which protects a different part of the primary QoS path, have been disclosed. An important concept in the context of these algorithms is that of adjusted delays, which allows existing path algorithms (e.g., Bellman-Ford (Cormen, et al., supra) and Hassin's (Hassin, supra)) to be adapted in order to identify suitable restoration topologies. Efficient approximation schemes with proven performance guarantees could therefore be derived. Specifically, an $O(MN(1/\epsilon + \log N))$ approximation algorithm (Algorithm P+RT) that provides $(3 \cdot (1+\epsilon), 2)$-approximate solutions for link failures was presented. The algorithm was extended for directed networks, which achieved a $(3 \cdot (1+\epsilon), 3)$-approximate solution.

Although the present invention has been described in detail, those skilled in the art should understand that they can make various changes, substitutions and alterations herein without departing from the spirit and scope of the invention in its broadest form.

What is claimed is:

1. A computer-readable medium having stored thereon a plurality of instructions including instructions that when executed by a processor cause the processor to implement a system for provisioning QoS paths with restoration in a network, comprising:
 a primary path generator configured to identify a primary QoS path for normal network operation between source and destination nodes in a network;
 an auxiliary graph generator, associated with said primary path generator, configured to construct a directed auxiliary graph from an undirected graph representing said network by reversing each link in said primary QoS path of said undirected graph and replacing each other link in said undirected graph that is not a link in said primary QoS path by two directed links;
 a walk identifier, associated with said auxiliary graph generator, configured to identify a walk in said auxiliary directed graph including bridges in said network; and
 a bridge identifier, associated with said walk identifier, configured to decompose said walk into a set of bridges in said network such that each link of said primary QoS path is protected by a bridge of said set of bridges and each bridge of said set of bridges protects a different portion of said primary QoS path, wherein a restoration path between said source and said destination includes a bridge from said set of bridges and links of said primary QoS path, both of said restoration path and said primary QoS path satisfying QoS constraints.

2. The system as recited in claim 1 wherein said auxiliary graph generator is further configured to assign a zero cost to said each link and said walk identifier is configured to reduce a cost of said walk.

3. The system as recited in claim 1 wherein said walk identifier is configured to satisfy a delay constraint and apply a modified restricted shortest path algorithm to identify said walk.

4. The system as recited in claim 1 wherein said walk identifier is configured to identify multiple walks in said auxiliary directed graph, said multiple walks representing multiple restoration paths.

5. The system as recited in claim 1 wherein said QoS constraints include both a bandwidth constraint and a delay constraint.

6. The system as recited in claim 1 wherein one of said QoS constraints is a delay constraint and a delay of a bridge of said set of bridges is no greater than a total delay of said primary QoS path subtracted from a sum of said delay constraint and a delay of a link of said primary QoS path protected by said bridge.

7. The system as recited in claim 1 wherein an adjusted delay is applied to said walk to determine if said walk represents a feasible restoration topology, wherein a value of an adjusted delay of a walk terminating at a node $u_k$ in said network is based on if node $u_{k-1}$ is a node of said primary QoS path.

8. A method of provisioning QoS paths with restoration in a network, comprising:
 identifying a primary QoS path for normal network operation between source and destination nodes in a network, said primary QoS path satisfying both a bandwidth constraint and a delay constraint;
 constructing a directed auxiliary graph from an undirected graph representing said network by reversing each link in said primary QoS path of said undirected graph and replacing each other link in said undirected graph that is not a link in said primary QoS path by two directed links;
 identifying a walk in said auxiliary directed graph, corresponding to a set of bridges in said network, that represents a restoration topology for said primary QoS path; and
 decomposing said walk into a set of bridges in said network such that each link of said primary QoS path is protected by a bridge of said set of bridges and each bridge of said set of bridges protects a different portion of said primary QoS path, wherein a restoration path between said source and said destination includes a bridge from said set of bridges and links of said primary QoS path, said restoration path and said primary QoS path both satisfying QoS constraints.

9. The method as recited in claim 8 further comprising assigning a zero cost to said each link and reducing a cost of said walk.

10. The method as recited in claim 8 wherein said identifying said walk comprises satisfying a delay constraint and employing a modified restricted shortest path algorithm to identify said walk.

11. The method as recited in claim 8 wherein said identifying said walk comprises identifying multiple walks in said auxiliary directed graph, said multiple walks representing multiple restoration paths.

12. The method as recited in claim 8 further comprising applying an adjusted delay to said walk to determine if said walk represents a feasible restoration topology.

13. The method as recited in claim 12 wherein said feasible restoration topology has a cost that is limited based on a minimum cost of said restoration topology.

14. The method as recited in claim 8 wherein said identifying comprises combining ones of said bridges to form said restoration topology.

15. A method of provisioning restoration paths in a network, comprising:
 constructing a graph representing said network and having nodes and links;
 identifying a primary QoS path in said graph for normal network operation between a source node and destination node in said network, said primary Qos path satisfying both a bandwidth constraint and a delay constraint;
 reversing all of said links that are in said primary QoS path and replacing each other link in said graph that is not a link in said primary QoS path by two directed links;
 finding in said graph a lower cost walk having a set of bridges in said network, said walk satisfying adjusted delay constraints; and
 selecting a subset of bridges from said walk such that each link of said primary QoS path is protected, said subset constituting one of said restoration paths with each of said restoration paths including a bridge from said subset of bridges and links of said primary Qos path, said restoration path and said primary QoS path both satisfying QoS constraints.

16. The method as recited in claim 15 wherein a cost of said subset is a minimum.

17. The method as recited in claim 15 further comprising assigning a zero cost to said each link that originated from said primary QoS path and reducing a cost of said walk.

18. The method as recited in claim 15 wherein said selecting comprises satisfying a delay constraint and employing a modified restricted shortest path algorithm.

19. The method as recited in claim 15 wherein a value of an adjusted delay of a walk terminating at a node $U_k$ in said network is based on if $U_{k-1}$ is a node of said primary Qos path.

20. The method as recited in claim 15 further comprising combining ones of said bridges to form a restoration topology.

21. The method as recited in claim 20 wherein said restoration topology is an optimal restoration topology in which each link is shared by at most two bridges.

* * * * *